Nov. 4, 1969  L. V. PRICE  3,475,887
LAWN EDGER HAVING CUTTINGS COLLECTION MEANS
Filed Dec. 26, 1967
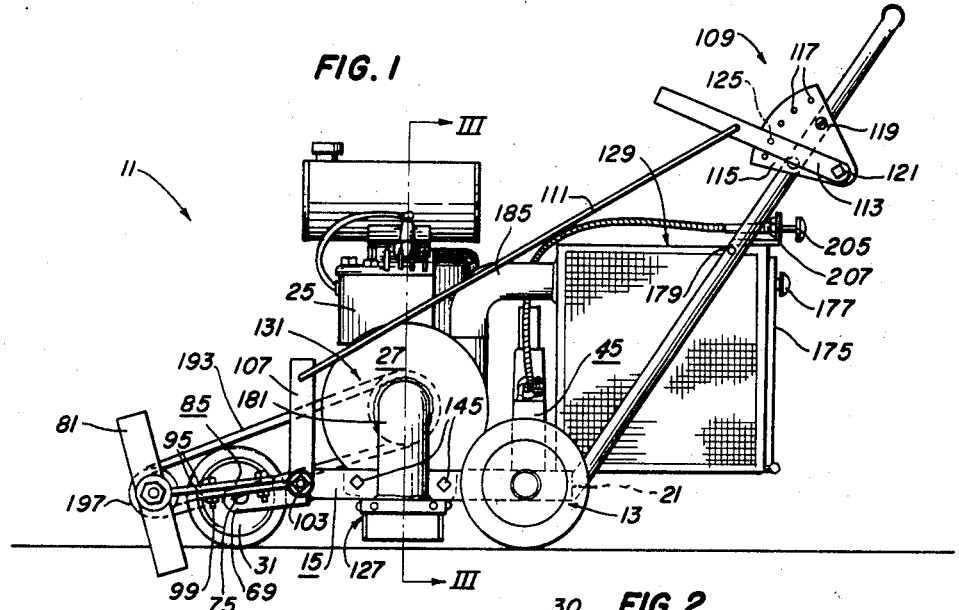
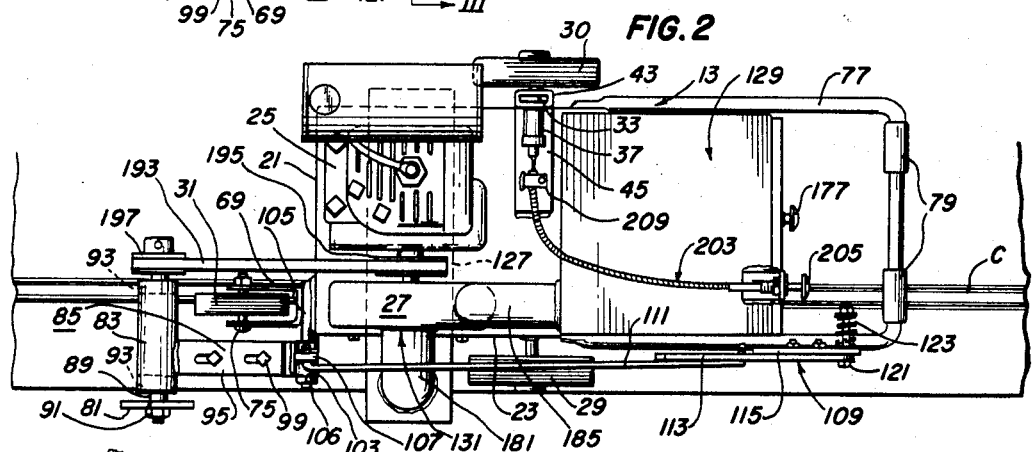
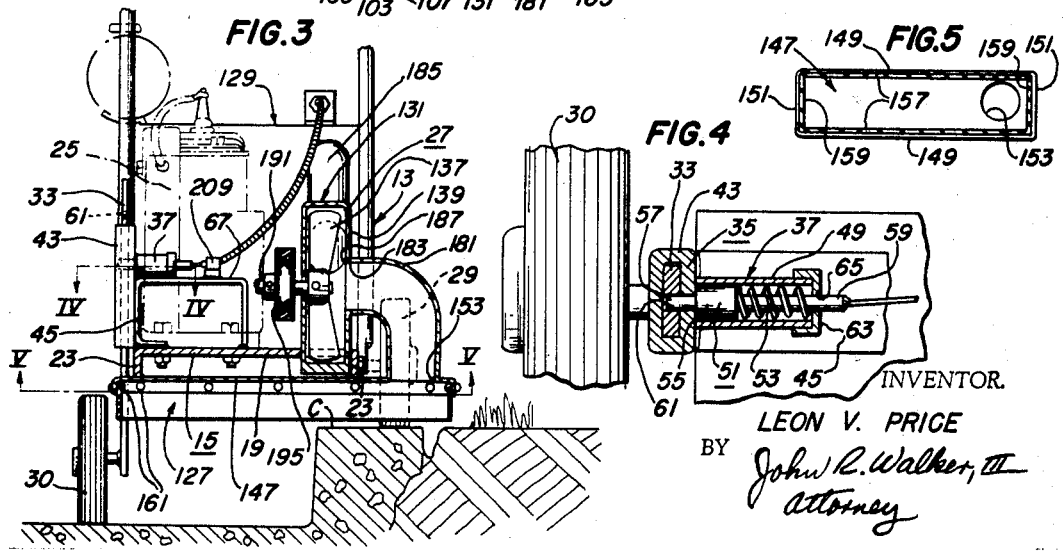
INVENTOR.
LEON V. PRICE
BY John R. Walker, III
attorney

United States Patent Office 3,475,887
Patented Nov. 4, 1969

3,475,887
LAWN EDGER HAVING CUTTINGS COLLECTION MEANS
Leon V. Price, 618 Lyncrest, Memphis, Tenn. 38122
Filed Dec. 26, 1967, Ser. No. 700,313
Int. Cl. A01d 35/24, 53/14, 87/10
U.S. Cl. 56—25.4      6 Claims

ABSTRACT OF THE DISCLOSURE

A combination lawn edger and suction means for picking up the grass cuttings left by the edger. The lawn edger includes a wheeled carriage adapted to be manually moved along a walk or the like to cut the grass at the edge thereof. A cutting blade powered by a gasoline motor is mounted on the carriage for rotation about a horizontal axis. Lever actuated adjustment means is provided for regulating the elevation of the cutting blade. A downwardly opening head member is supported from the carriage rearwardly of the cutting blade, and fan and conduit means are in communication with the head member for creating a suction in the head member to clean up the area under the head member and deposit the matter collected into a basket mounted on the carriage.

BACKGROUND OF THE INVENTION

Field of the invention

This invention relates to lawn edges having collection means for picking up the grass cuttings and the like left by the edger.

Description of the prior art

There have been various devices for edging lawns, such as those disclosed in Patents No. 2,787,107; 2,847,813; and 2,977,740. Also, there have been power driven lawn sweepers and the like, such as those disclosed in Patents No. 2,538,643 and 3,183,653. However, to my knowledge there have not been any devices for simultaneously edging and providing suction means for picking up the grass cuttings left by the edger.

SUMMARY OF THE INVENTION

The present invention provides a combined vertically disposed power driven edging blade mounted on a wheeled carriage, a downwardly opening head member disposed behind the edging blade, and suction means in communication with the head member for picking up, and depositing in a basket, the grass cuttings and the like from the ground behind the edging blade as the carriage is pushed along while edging the lawn.

The general object of the present invention is thus to eliminate such clean-up work usually associated with the job of edging a lawn by providing a lawn edger having a receptacle or basket carried on the edger and pneumatic means for removing the cuttings from the walk or the like and conveying them to the basket.

BRIEF DESCRIPTION OF THE DRAWINGS

FIG. 1 is a side elevational view of the lawn edging device of the present invention.

FIG. 2 is a top plan view thereof.

FIG. 3 is a sectionalized transverse view taken as on the line III—III of FIG. 1.

FIG. 4, taken as on the line IV—IV of FIG. 3, is an enlarged sectional view of a part of the curb adjustment mechanism and with fragmentary portions of related parts also being shown.

FIG. 5 is a sectional view, on a reduced scale, taken as on the line V—V of FIG. 3.

DESCRIPTION OF THE PREFERRED EMBODIMENT

Referring now to the drawings in which the various parts are indicated by reference characters, the lawn edger, designated 11, includes a wheeled carriage 13 having a frame member 15. Frame member 15 is preferably of metal plate material and includes a horizontally disposed main portion 19, front and rear flanged portions 21, and flanged side portions 23. Frame member 15 is of generally square shape, as viewed from above, and serves as a base member for drive motor 25 and fan means 27. The arrangement of the wheel means of the device is best seen in FIG. 2 and includes a pair of rearwardly disposed wheel and axle assemblies 29, 30 and a forwardly disposed wheel and axle assembly 31. The paired rear wheel assemblies 29, 30 are somewhat larger than the front wheel and support most of the weight of the edger and the load of the cuttings. Wheel and axle assemblies 29, 30 are respectively spaced somewhat from side portions 23 of frame member 15 and relative to member 15 are substantially transversely disposed. Assembly 29 is fastened securely to the left flanged portion 23 of frame member 15, as by welding.

Assembly 30 is movably attached to frame member 15 by a leg member 33, bracket means 35, and an adjustment mechanism 37. Leg member 33 is preferably bar material of rectangular section. The axle of assembly 30 is abuttingly attached as by welding to the lower portion of leg member 33 and extends substantially perpendicularly therefrom. Bracket means 35 attaches leg member 33 to frame member 15 and includes a rectangular sleeve 43 and a support piece 45. Support piece 45 is preferably of inverted U shape and is fixedly attached at the ends thereof to the top surface of and at the right rear corner of frame member 15. Sleeve 43 is fixedly attached to the outside leg of support piece 45 with the bottom end edge thereof substantially level with the top surface of main portion 19 of frame member 15, as best seen in FIG. 3. The upper portion of leg member 33 is slidably received in sleeve 43 and projects upwardly somewhat from bracket means 35.

Adjustment mechanism 37 interconnects bracket means 35 and leg member 33 and preferably includes a tubular casing 49, a plunger 51 and a compression spring 53, as best seen in FIG. 4. Plunger 51 includes a center shouldered enlarged portion 55 and oppositely disposed end portions 57, 59. Tubular casing 49 slidably receives plunger 51 and is perpendicularly attached as by welding to the inward side of sleeve 43. Portion 57 of plunger 51 extends through an aperture in sleeve 43 and is selectively received in one of a plurality of openings 61 in leg member 33. Openings 61 are vertically spaced along the leg member 33 in the upper portion thereof and are spaced at such distances as to correspond with the various street curb heights.

Spring 53 is convolutely disposed around end portion 59 of plunger 51 and abuttingly engages shouldered portion 55. A cylindrical cap 63, having a centrally disposed aperture 65 therein, is fixedly attached to tubular casing 49 and slidably receives pluger 51. Spring 53 interengagingly abuts shoulder portion 55 and cap 63 and yieldably urges plunger 51 into a selected one of openings 61 of leg member 33. For additional strength, tubular casing 49 and slidably receives plunger 51. Spring 53 interengagingly of U-shaped support piece 45.

Front wheel and axle assembly 31 is fixedly attached to and projects forwardly from the left front portion of frame member 15. A yoke member 69 is provided and is attached to forward flange 21 of frame member 15, as by welding. A threaded fastener 75 extends through aligned openings in the forked end of yoke member 69 and through the axle of wheel and axle assemble 31 to supportingly fasten assembly 31 to frame member 15.

Wheeled carriage 13 incldues an inverted U-shaped handle 77 which is rigidly attached at the lower ends thereof to the respective rear corner portions of frame member 15. A pair of rubber hand grips 79 are preferably provided on the horizontal portion of handle 77.

A blade 81 is pivotally mounted from the left front portion of frame member 15 about a horizontal axis. The mounting means includes a cylindrical housing 83, an adjustable support 85 perpendicularly fixed to cylindrical housing 83, and pivot means pivotally attaching support 85 to frame member 15. Blade 81 is of the usual type having a central aperture through which blade shaft 89 extends. A nut 91 threadedly attaches blade 81 to an end of shaft 89. A pair of spaced bearings 93 fitted in the oppositely disposed end portions of cylindrical housing 83 rotatably mount shaft 89.

Adjustable support 85 preferably includes two like support pieces 95 of rectangular section and in parallel and overlapping engagement. Pieces 95 are provided respectively with slotted apertures through which a pair of threaded fasteners 99 extend and adjustably position the extension of support 85. The lower one of support pieces 95 is provided with a tubular bearing 103 fixedly attached to the rearward end portion thereof. A pivot shaft 105 projects laterally from and is fixedly attached to frame member 15. Support 85 is pivotally mounted from shaft 105 and is secured thereon by a nut 106.

Means for regulating the pivotal movement of support 85 and the elevation of blade 81 is provided and preferably includes a stud 107, a lever adjustment mechanism 109, and a rod 111. Stud 107 is preferably of rectangular section and is attached at the lower end thereof as by welding to tubular bearing 103. Lever adjustment mechanism 109 incldues a lever 113 and a sextant-shaped plate 115. Plate 115 is provided with an aperture in the apex portion thereof and an arced row of apertures 117 radially spaced equidistantly from the aperture in the apex portion thereof. Plate 115 is fixedly attached to handle 77 preferably by a pair of flush-head fasteners 119 extending through plate 115 and handle 77. A threaded fastener 121 and a coiled compression spring 123 provide laterally yieldable pivot means for attaching lever 113 to plate 115. A short pin 125 is perpendicularly affixed to the midportion of lever 113 and is receivable in a selected one of the row of apertures 117. Rod 111 is provided with perpendicularly formed end portions which are received respectively in apertures provided in lever 113 and stud 107.

The pneumatically operable elements of the device comprise generally a head member 127, a basket 129, a fan 131, and conduit means respectively interconnecting these parts. Fan 131 is of the well-known centrifugal type and includes an impeller 137 rotatably mounted in a circular housing 139. The lower portion of housing 139 is fitted in a rectangular aperture provided along the left side of main portion 19 of frame member 15. A pair of cap screws 145 extend through apertures provided in the left flange portion 23 of frame member 15, threadedly engage housing 139, and fixedly mount fan 131 on wheeled carriage 13.

Head member 127 includes a substantially rectangular top panel 147 with the edge portions thereof formed to establish front and rear flanges 149 and right and left flanges 151. Top panel 147 of head member 127 is preferably attached as by welding to the bottom edge of the respective side portions 23 of frame member 15. Top panel 147 is offset laterally of wheeled carriage 13 and is provided with an aperture 153 disposed outwardly of portion 23 of frame member 15. Head member 127 also includes skirt means which include oppositely disposed side skirts 157 and end skirts 159 attached respectively to flanges 149, 151 of top panel 147. Skirts 157, 159 are preferably of rubber or other such flexible material and are attached at the upper portions thereof to the respective flanges of top panel 147 by rivets 161.

Basket 129 is mounted rearwardly on carriage 13 and between the side portions of handle 77. Basket 129 is substantially cube-shaped and includes an inside framework, not shown, supporting front, top, and bottom solid panels and screened side panels. A downwardly opening door 175 is provided at the back of basket 129 for entry therein and is provided with a latch member 177. Screws 179 extending through apertures in the side portions of handle 77 preferably attach basket 129 to wheeled carriage 13.

The conduit means of the device include first and second conduit means. The first conduit means includes an elongated tubular elbow member 181 of circular section sealingly attached respectively at the opposite ends thereof to aperture 153 in head member 127 and to centrally disposed inlet passageway 183 in fan housing 139. The second conduit means includes a tubular elbow member 185 of somewhat smaller cross-section than elbow member 181 and extends from outlet passageway 187 in fan housing 139 to an opening in the upper portion of the front of basket 129.

In the drive means of the device, motor 25 preferably drives fan 131 direct from the end portion of motor shaft 191 and drives blade 81 by belt 193 and pulleys 195, 197.

With reference to the fan drive and to FIG. 3, it will be noted that fan 131 is spaced somewhat from motor 25, and the end portion of motor shaft 191 extends through an aperture in the central portion of the fan housing, and the hub of impeller 137 is secured to the end portion of motor shaft 191. Impeller 137 is thus rotatably supported by the motor bearings which support motor shaft 191.

In the blade drive, V-type belt and pulleys are preferably employed, and this drive is as follows: Drive pulley 195 is fixedly attached to motor shaft 191 between the motor and fan. Driven pulley 197 is fixedly attached to blade shaft 89 at the end remote from blade 81. Belt 193 drivingly connects pulleys 195, 197 and interconnectingly transmits power from motor 25 to blade 81. To adjustably tension belt 193, the extension of support 85 is adjusted. This is done by loosening threaded fasteners 99 and, with the blade in the downwardly or working position, extendingly separating pieces 95 to tighten belt 193, and then securely retightening threaded fasteners 99. Blade 81 is disengageable from motor 25 by the manipulation of adjustment mechanism 109 to pivotally raise blade 81 and to disengagingly loosen belt 193.

An additional feature preferably included in the device of the present invention is the provision of remote control means for controlling the actuation of curb wheel adjustment mechanism 37. The remote control means includes a cable and housing assembly 203 having a proximal end and a distal end and a control knob 205 operably carried in the assembly adjacent the proximal end portion thereof. The housing and proximal end portion of assembly 203 are mounted rearwardly on carriage 13 and preferably to basket 129. The means attaching assembly 203 to the basket preferably includes an L-shaped bracket 207 fixedly attached to the rear portion of the basket top. The distal end of the housing of assembly 203 is fixedly attached to the top portion 67 of support piece 45 by a screw-fitted clamp 209. The distal end portion or the cable of assembly 203 is connected to end portion 59 of plunger 51 of adjustment mechanism 37. The manipulation of control knob 205 slidingly actuates plunger 51 against spring 53 and thus retractably disengages or releasably engages the end portion 57 of plunger 51 with a selected one of bore openings 61 in leg member 33.

Fan 131 is directly driven from motor 25; therefore suction is formed at head member 127 continuously as the motor is run. In edging along a sidewalk or other such flat surface, wheel and axle assembly 30 is in an elevated position, and the pair of rearwardly disposed wheel and axle assemblies are positioned level. The edging device is moved forwardly along the lawn edge and over the walk or supporting surface, and by the manipulation of lever adjustment mechanism 109 the desired depth of cut of blade 81 is obtained.

For edging the grass along a curb or the like, wheel and axle assembly 30 is vertically adjusted with the curb adjustment mechanism of the device. To make this adjustment, control knob 205 is pulled rearwardly, and after positioning assembly 30 in a correct position, knob 205 is released. This allows plunger 51 to seat in a bore opening 61 and to lock wheel and axle assembly 30 in a correct position. The device is illustrated being used as a curb edger in FIG. 3, and edging along a curb C. In this figure, it will be noted that the head member 127 is so arranged as to provide maximum suction adjacent the grooved path or kerf of the blade and adjacent such grass or cuttings as is left from the blade; that is, the suction aperture 153 in head member 127 is substantialy over the cut path of the blade, and the suction is thus stronger in the portion of head member 127 which is adjacent the walk or curb surface being edged. It can be realized that this is a very desirable feature of the device, particularly for its use as a curb edger. When used as a curb edger, some air will enter along the street side of the curb, and there will not be as much suction present as when the device is used to edge a walk or the like. However, because of the above-mentioned feature, sufficient suction is present to effectively elevate the cuttings into the basket.

From the foregoing, it can be readily seen that the present invention provides a very useful device, and one which substantially eliminates such "clean-up" work as is usually associated with the job of edging a lawn. In addition, it will be understood that the device of the present invention is useful in picking up cuttings, etc., not only behind the cutting blade but also across adjacent areas such as across the width of the sidewalk and in the gutter. In addition, the device of the present invention provides means for picking up and mulching leaves as they come in contact with the rapidly rotating impeller blade 137. The lawn edger of the present invention also provides, in the curb wheel adjustment thereof, a substantially simple and practical adjustment mechanism.

In summary, the lawn edger of the present invention provides a very practical tool for edging a lawn, and one that is economical to make and sell an that is easy to operate and maintain.

Although the invention has been described and illustrated with respect to a preferred embodiment thereof, it is to be understood that it is not to be so limited since changes and modifications may be made therein which are within the full intended scope of this invention as hereinafter claimed.

I claim:
1. In combination, a wheeled carriage, cutting means including a vertically disposed cutting blade rotatable about a horizontal axis supported from said carriage for edging a lawn, a downwardly opening head member supported from said carriage adjacent the ground and behind said cutting means in position to pass over the edge of the lawn after being edged by said cutting means, and means in communication with said head member for creating a suction in said head member to clean up the area beneath said head member.

2. The combination of claim 1, in which is included receptacle means supported from said carriage, and in which is included means communicated with said receptacle means and with said means for creating a suction for depositing the material cleaned up into said receptacle means.

3. In combination, a wheeled carriage including a frame member, vertically disposed rotatable blade means supportably mounted from said wheeled carriage for rotation about a horizontal axis to edge lawns and the like, a fan including a housing having an inlet passageway and an outlet passageway, a hollow downwardly opening head member attached to said frame member and having the opening thereof adjacent the ground, a receptacle carried by said wheeled carriage; first conduit means connecting said head member to said inlet passageway and said fan, second conduit means connecting said outlet passageway and said fan to said receptacle, a motor secured on said frame member, and means drivingly connecting said motor to said blade means and to said fan.

4. The combination of claim 3 in which said head member extends substantially the width of said wheeled carriage.

5. The combination of claim 4 in which said head member includes flexible depending skirt means around the periphery of said head member.

6. The combination of claim 5 which includes lever actuated adjustment means for regulating the elevation of said rotatable blade means.

References Cited

UNITED STATES PATENTS

| | | | |
|---|---|---|---|
| 2,539,779 | 1/1951 | Grosso | 56—25.4 |
| 2,547,328 | 4/1951 | Koch et al. | 56—25.4 |
| 2,787,107 | 4/1957 | Strasel | 56—25.4 |
| 2,847,813 | 8/1958 | Hanson et al. | 56—25.4 |
| 2,977,740 | 4/1961 | King | 56—25.4 |
| 2,978,859 | 4/1961 | Tubbs | 56—328 |
| 3,058,284 | 10/1962 | Anderson | 56—25.4 |
| 3,065,588 | 11/1962 | Shaw | 56—25.4 |
| 3,079,743 | 3/1963 | Egley | 56—25.4 |
| 3,183,653 | 5/1965 | Cromwell | 56—27 |

RUSSELL R. KINSEY, Primary Examiner

U.S. Cl. X.R.

172—15